US012444256B2

(12) United States Patent
Amir

(10) Patent No.: US 12,444,256 B2
(45) Date of Patent: Oct. 14, 2025

(54) PADLOCK

(71) Applicant: Essence Security International (E.S.I.) Ltd., Herzlia Pituach (IL)

(72) Inventor: Ohad Amir, Herzlia (IL)

(73) Assignee: Essence Security International (E.S.I.) Ltd., Herzlia Pituach (IL)

(*) Notice: Subject to any disclaimer, the term of this patent is extended or adjusted under 35 U.S.C. 154(b) by 0 days.

(21) Appl. No.: 18/259,945

(22) PCT Filed: Dec. 15, 2021

(86) PCT No.: PCT/IL2021/051495
§ 371 (c)(1),
(2) Date: Jun. 29, 2023

(87) PCT Pub. No.: WO2022/144870
PCT Pub. Date: Jul. 7, 2022

(65) Prior Publication Data
US 2024/0087385 A1 Mar. 14, 2024

(30) Foreign Application Priority Data

Dec. 29, 2020 (GB) .................................. 2020686

(51) Int. Cl.
*G07C 9/00* (2020.01)
(52) U.S. Cl.
CPC ................. *G07C 9/00571* (2013.01)
(58) Field of Classification Search
None
See application file for complete search history.

(56) References Cited

U.S. PATENT DOCUMENTS

| 10,019,860 | B1* | 7/2018 | Kim | G07C 9/00896 |
| 10,319,165 | B2* | 6/2019 | Gengler | G07C 9/00571 |
| 10,378,241 | B2 | 8/2019 | Al-Kahwati et al. | |
| 10,818,117 | B2 | 10/2020 | Grzenda et al. | |
| 12,008,849 | B2* | 6/2024 | Ko | G07C 9/00309 |
| 2008/0246587 | A1* | 10/2008 | Fisher | E05B 19/0005 |
| | | | | 340/5.73 |
| 2009/0066488 | A1* | 3/2009 | Qiahe | B60R 25/102 |
| | | | | 340/541 |
| 2011/0087913 | A1* | 4/2011 | Robles | G06F 1/3215 |
| | | | | 713/401 |

(Continued)

FOREIGN PATENT DOCUMENTS

| DE | 4313850 A1 * | 11/1994 | ......... B60R 25/1004 |
| EP | 2259165 A2 * | 12/2010 | ........... G06F 1/3203 |
| WO | 2022144870 A1 | 7/2022 | |

OTHER PUBLICATIONS

Foreign Communication from a Related Counterpart Application, International Preliminary Report on Patentability dated Jul. 4, 2023, International Application No. PCT/IL2021/051495 filed on Dec. 15, 2021.

(Continued)

*Primary Examiner* — Carlos Garcia
(74) *Attorney, Agent, or Firm* — Conley Rose, P.C.

(57) ABSTRACT

A padlock is provided with a transceiver to enable authorisation of an unlocking action by an authority. To control power consumption, a motion detector is used to activate the device from a dormant, low power consumption state.

15 Claims, 8 Drawing Sheets

(56) References Cited

U.S. PATENT DOCUMENTS

| | | | |
|---|---|---|---|
| 2013/0043973 A1* | 2/2013 | Greisen | G07C 9/00817 340/5.51 |
| 2013/0317693 A1* | 11/2013 | Jefferies | G06Q 30/0645 701/31.5 |
| 2013/0335193 A1 | 12/2013 | Hanson et al. | |
| 2018/0018841 A1* | 1/2018 | Gengler | G07C 9/00174 |
| 2018/0018843 A1 | 1/2018 | Gengler et al. | |
| 2019/0371097 A1 | 12/2019 | Kolb et al. | |

OTHER PUBLICATIONS

Foreign Communication from a Related Counterpart Application, International Search Report and Written Opinion dated Mar. 25, 2022, International Application No. PCT/IL2021/051495 filed on Dec. 15, 2021.

* cited by examiner

PADLOCK

CROSS-REFERENCE TO RELATED APPLICATIONS

The present application is a filing under 35 U.S.C. 371 as the National Stage of International Application No. PCT/IL2021/051495, filed Dec. 15, 2021, entitled "A Padlock," which claims priority to United Kingdom Application No. 2020686.8 filed with the Intellectual Property Office of The United Kingdom on Dec. 29, 2020, both of which are incorporated herein by reference in their entirety for all purposes.

FIELD

The present disclosure relates to a padlock.

BACKGROUND

A padlock can be used to secure a door or other portal, and to secure an object such as a parked bicycle.

A padlock generally comprises a body, a shackle and a locking mechanism. The shackle can be placed in a closed state or an open state. In the open state, the shackle can be placed around an object, then placed in the closed state, embracing the object. The locking mechanism, in use, retains the shackle in the closed state; the locking mechanism can be shifted into an unlocked state in which case the shackle can be released from the closed state into the open state. The locking mechanism can be key operated or, for example, can comprise rollers of a combination lock. As used herein, except where the context requires otherwise, the terms "comprises", "includes", "has", and grammatical variants of these terms, are not intended to be exhaustive. They are intended to allow for the possibility of further additives, components, integers or steps.

DETAILED DESCRIPTION OF THE EMBODIMENTS

In general terms, embodiments disclosed herein provide a padlock with a transceiver to enable authorisation of an unlocking action by an authority. To control power consumption, a motion detector is used to activate the device from a dormant, low-power consumption state.

Figure 1:
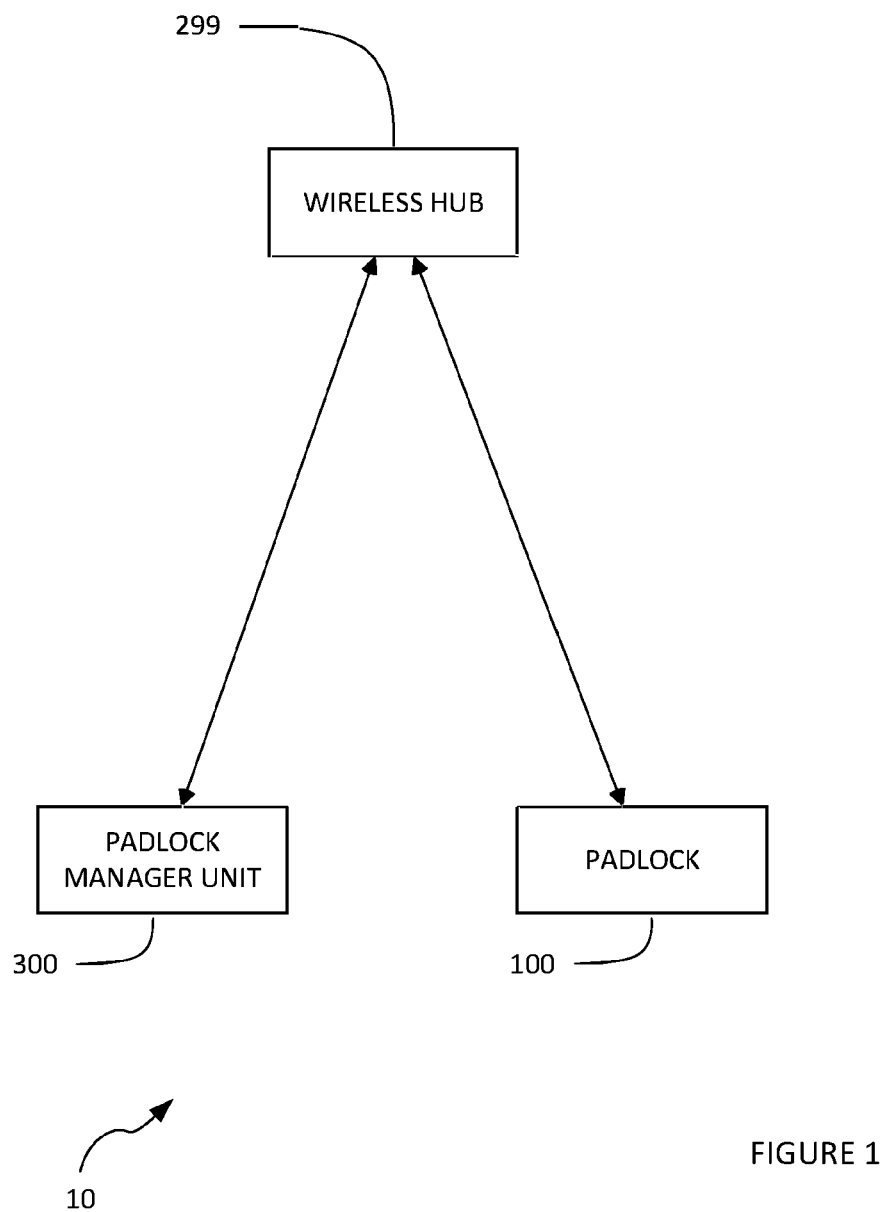
FIG. 1 illustrates a system in accordance with an embodiment.

FIG. 1 illustrates a general arrangement of a system 10 including a padlock 100 with remote unlocking facility, in accordance with a first embodiment. The padlock 100 is shown in wireless communication with a network hub 299. This wireless communication can be implemented using a standardised wireless communications protocol, such as a protocol in the 3GPP family of protocols, e.g. 4G or 5G, or a relatively local protocol e.g. a wireless Local Area Network protocol, a protocol based on IEEE 802.15.4, Bluetooth, a Home or Campus Area Network protocol, etc, or a proprietary wireless protocol for a comparable area.

In this example, the network hub 299 is a cellular base station with associated equipment to establish wireless cellular communication, such as using the 4G or 5G suite of standardised protocols.

The padlock 100 comprises processing electronics which, in use, can be in a dormant (low power consumption) state or an active state. The padlock processing electronics are designed such that, to enter the dormant state, as many non-essential elements and processes are deactivated as possible, so as to avoid unnecessary power consumption. For instance, in the dormant state, it is envisaged that a wireless communication interface of the padlock will be disabled. This takes account that cellular communication, particularly 4G and 5G protocol communication, can be power consumptive.

The padlock 100 comprises a mechanism or facility responsive to physical movement of the padlock. On such physical movement, the processing electronics is brought into the active state.

In use, a padlock manager unit 300 is initiated, for instance by user input action, to permit the padlock 100 to be opened. The present disclosure envisages a use case whereby the padlock manager unit 300 grants permission to a permitted user to open the padlock. This permission may, in some embodiments, be time-limited; that is, the permitted user will have a certain period of time within which to open the padlock with permission.

As illustrated in FIG. 1, the padlock manager unit 300 is in communication with the network hub 299. This enables the padlock manager unit 300 and the padlock 100 to establish a channel of communication.

In this use case, the permission may be granted on user input action at the padlock manager unit 300. For instance, an authoriser, or owner, of the padlock, may grant permission to a permitted user. The granting of the permission may be by appropriate entry in a user interface offered by the padlock manager unit 300.

While the padlock manager unit 300 is schematically illustrated in FIG. 1 as a single functional block, the reader will appreciate that, in certain embodiments, the function of the padlock manager unit 300 may be provided by distributed computer processing facilities, such as using a server/client structure for example between a processing service provider and an application run on a mobile telephone or other personal computing device. The server part of this server/client structure may itself be centralised or distributed, such as using an internet-enabled cloud based service.

The permitted user, on handling the padlock 100 for opening, will cause the padlock processing electronics to enter the active state. On initiation of the active state, the processing electronics will send an activation message to the wireless network, to the padlock manager unit 300. If this activation message corresponds with a granted permission, then the padlock manager unit 300 will send to the padlock 100 a padlock release message. The padlock 100 will be responsive to the padlock release message in different ways, depending on the specific implementation. In one implementation, the padlock 300 is spring-loaded to open automatically on receipt of the padlock release message. In another implementation, the padlock 100 is responsive to receipt of the padlock release message by becoming openable—that is it becomes possible for an authorised user to move a shackle of the padlock into an open condition.

Additionally or alternatively, if the activation message is received by the padlock manager unit 300 and there is no pending granted permission, an alarm will be raised that the padlock 100 is being manipulated by a user without permission to do so.

This embodiment is predicated on "keyless" operation. The permitted user is not required to carry a key or any other physical token to enable release of the padlock. The permitted user needs to take no action beyond manipulating (e.g. causing movement of) the padlock to bring it into an active condition. The actual release of the padlock is effected by the processing electronics of the padlock as a result of the succession of wireless communications messages authorising release.

In an embodiment, if a padlock release message is not received by the padlock 100, but the padlock 100 senses that it is still being moved, this is a potential indication that the person manipulating the padlock 100 does not have authorisation. In such a case, the padlock may be configured to emit an alarm signal. The alarm signal may comprise an alarm message emitted on the wireless connection to the padlock manager unit 300 via the network hub 299. The padlock manager unit 300 may, on receipt of an alarm message, generate an output (audible or visual) to alert a user of the padlock manager unit 300 that an unauthorised opening of the padlock has occurred. Alternatively, or additionally, receipt of an alarm message at the padlock manager unit 300 may trigger activation of a video camera overlooking the site of deployment of the padlock, so that a user of the padlock manager unit 300 can observe the situation and potentially determine the identity of the unauthorised individual at the padlock.

In another embodiment the hub 299 may comprise a control hub (e.g. a control panel) for an alarm system, which may store alarm states of the security system. The control hub may be installed at the same site or premises as the padlock 100. The control hub may use a relatively local protocol, such as described above, which may be used to operate a relatively local network that is distinct from a Wide Area Network used to connect to the padlock manager unit 300. The control hub may use one or more such relatively local protocols to communicate with the padlock and other locally installed security devices, e.g. passive infrared (PIR) detectors, door/window sensors, cameras, etc. A local siren for sounding a local alarm may be included in or commanded by the control hub.

For such an embodiment, the alarm signal from the padlock 100 may comprise an alarm message emitted on the wireless connection to the network hub 299. The padlock network hub 299 may, on receipt of an alarm message, control the local siren to sound to alert a user of the padlock manager unit 300 that an unauthorised opening of the padlock has occurred. Alternatively, or additionally, receipt of an alarm message at the network hub 299 may trigger activation of a video camera overlooking the site of deployment of the padlock, so that a user of the padlock manager unit 300 can observe the situation and potentially determine the identity of the unauthorised individual at the padlock.

As will be appreciated, in embodiments comprising a control hub, by interfacing between padlock manager and the padlock, the control hub may control and/or alter communications between the padlock and padlock manager. For example, upon receiving a message from the padlock, the control hub may decide not to send a corresponding message to the padlock manager, for example if the security system is in an unarmed state.

The alarm signal may alternatively or additionally comprise an audible alarm emitted by the padlock, to attract the attention of passers-by to the unauthorised padlock opening. Embodiments may include provision of a separate alarm sounder unit in the environs of the padlock, so that an audible alarm can be triggered by the alarm message, or by an alarm beacon message sent by the padlock manager unit 300 in response to receipt of the alarm message.

To avoid or reduce false alarms, a distinction may be made between a short movement of the padlock 100, which may be an inadvertent jostling of the padlock, and a prolonged series of movements indicative of a persistent attempt to open the padlock.

The components of the system as illustrated in FIG. 1 will now be described in further detail.

Figure 2:
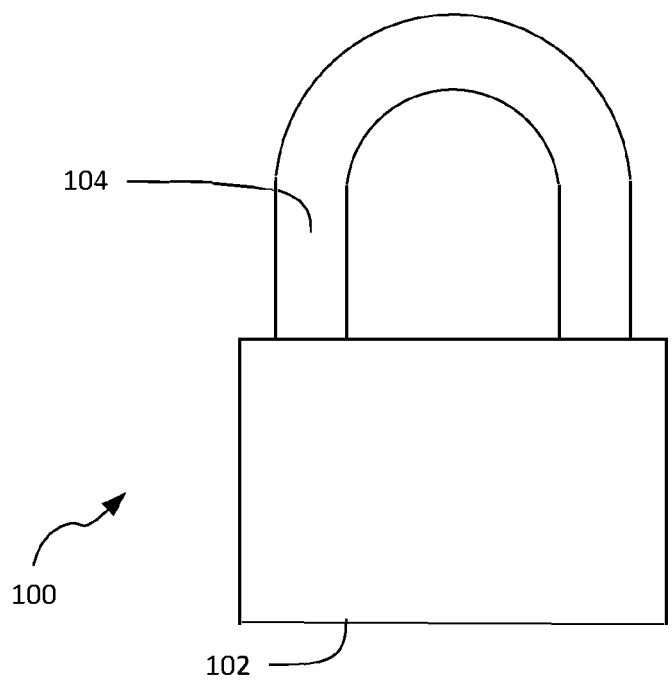
FIG. 2 illustrates a padlock of the system of FIG. 1.

FIG. 2 illustrates the padlock 100 of FIG. 1. The padlock 100 is shown in a locked, or at least closed, condition. The padlock 100 comprises a generally cuboidal body 102. One face of the body 102 has a pair of openings from which extend a shackle 104. The shackle 104 has a semi-circular portion, from the ends of which two parallel linear portions extend into the body 102 through the openings defined therein.

Figure 3:
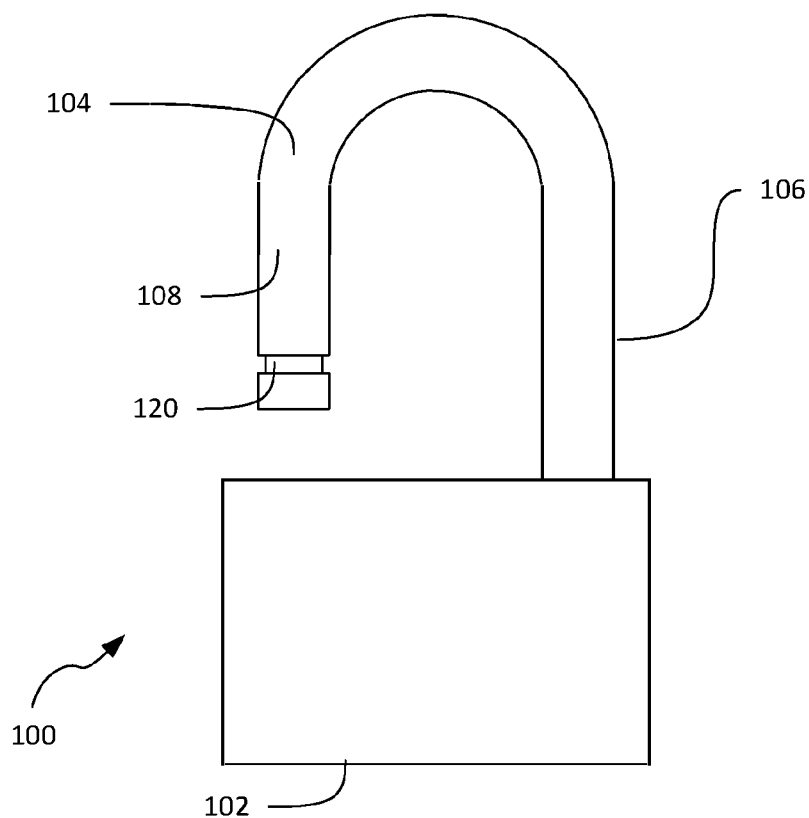
FIG. 3 illustrates the padlock of FIG. 2 in a released condition.

FIG. 3 shows the same padlock in a released condition. As shown in FIG. 3, the padlock 100 in a released condition permits the extension of the shackle 104 from the body 102. In this condition, it can be seen that one, 106, of the linear portions of the shackle 104 is longer than the other, 108. The longer linear portion 108 of the shackle 108 is captively engaged in the body 102 so that it can be moved linearly within a range of permitted movement, so as to engage or disengage the other linear portion 106 of the shackle 104 with the body. The shorter linear portion 106 has a circumferential groove 120 whose purpose will be described in due course. The shackle 104 can be rotated with respect to the body 102 about the central axis of the captive linear portion 108, so allowing the shackle 104 to be swung out and away from the body 102, to enable the shackle 104 to be engaged about an article to be locked.

Figure 4:
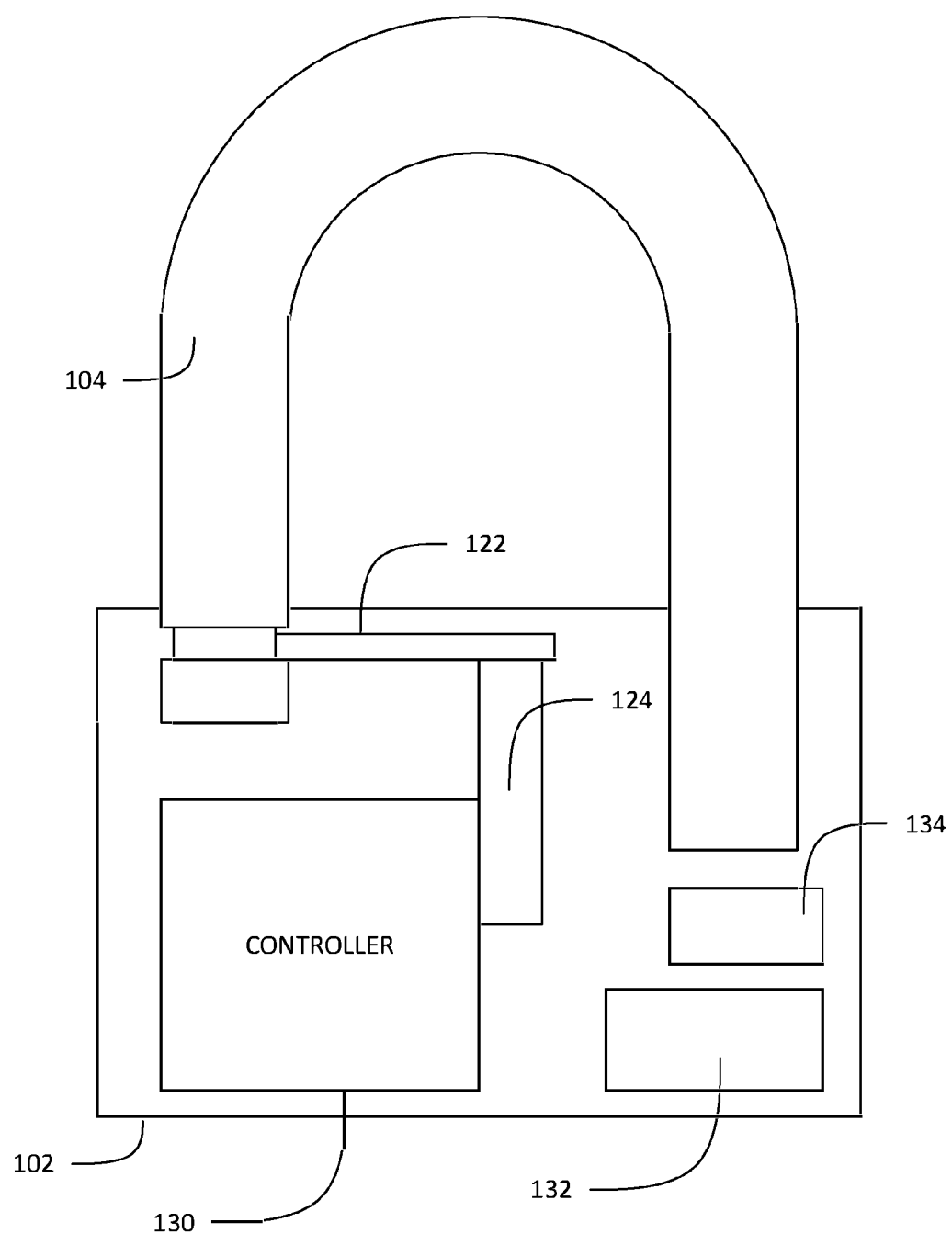
FIG. 4 illustrates a schematic interior view of the padlock of FIGS. 2 and 3.

FIG. 4 shows a schematic interior view of the padlock 100. The shackle 104 is in the locked condition. Internally, the groove 120 of the shackle 104 is engaged by a latch 122, which prevents the shackle 104 from being moved into the unlocked condition. In order to open the padlock 100, the latch 122 must be disengaged from the groove 120.

A latch displacement mechanism 124 is engaged with the latch 122, to perform this function. The latch displacement mechanism 124 is activated by a latch signal issued by a controller 130. The controller 130 is an electronic unit, served by a battery 132. A motion detector 134 is provided to detect motion (e.g. vibration, acceleration, reorientation, etc.) of the lock; the purpose of the motion detector 134 will become apparent from the following description.

Figure 5:
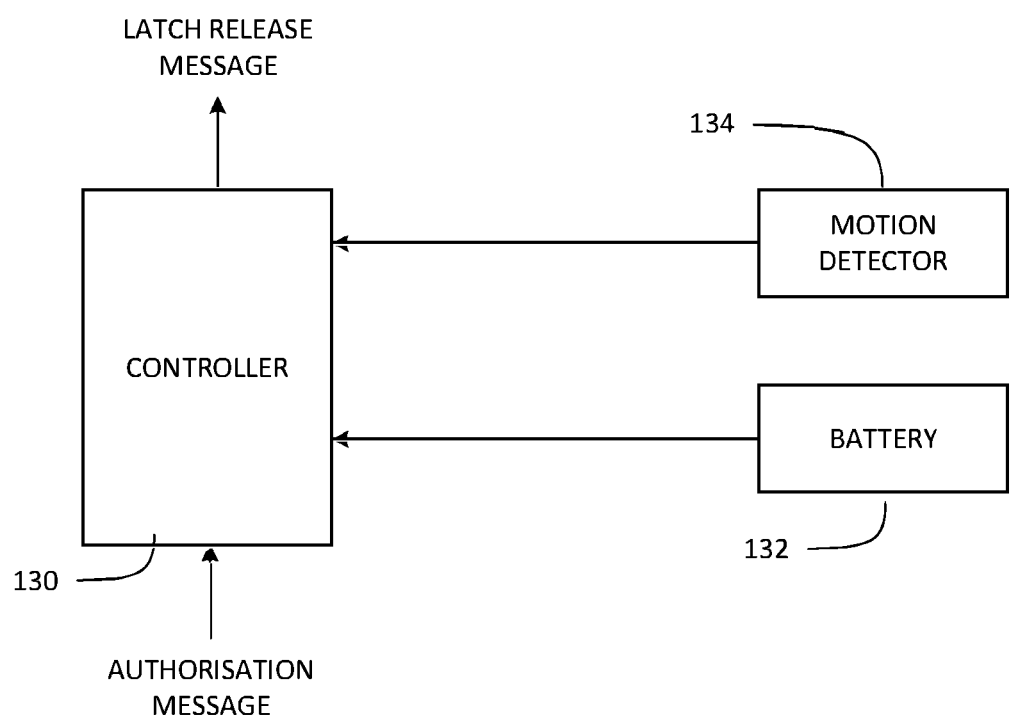
FIG. 5 is a schematic illustration of processing electronics of the padlock of FIGS. 2 and 3.

As shown in FIG. 5, each time the padlock 100 is moved from a stationary state, the resultant movement is detected by the motion detector 134. This causes the motion detector to emit an activation pulse to the controller 130.

The motion detector 134 is in one embodiment an accelerometer. A variety of suitable types of accelerometer exist. Broadly, all accelerometers operate on the principle of measuring displacement of a captive mass relative to a reference frame on subjection of an externally applied acceleration. This displacement may give rise to an electrical signal by means of, for example, an electromechanical machine, such as a generator or an inductive coil cooperating with an armature, a piezo-electric device, or any other means of converting mechanical work into an electrical signal.

Alternative types of motion detectors include a mechanical-based level/tilt sensor, a gyroscope, a piezoelectric sensor, or a magnetometer to sense changes in orientation with respect to the earth's magnetic field.

In certain embodiments, the motion detector comprises an electrical switch, wherein the electrical switch can be thrown on physical movement of the padlock 100. So, for example a tilt switch can be used to open or close a circuit depending on the orientation of the padlock, so that a change in orientation can throw the tilt switch. With suitable circuitry, the padlock 100 can, in a dormant state, consume no electrical power beyond leakage current—throwing the tilt switch (or other motion or gravity dependent switch) can be used to power-up the circuitry of the padlock 100 into an active state.

The specific type of motion detector employed in the padlock 100 is implementation specific.

The motion detector may be configured to detect motion in a particular axis, or more than one axis. In an embodiment, the motion detector is a three axis motion detector.

The motion detector 134 comprises processing circuitry operable to process a motion detection signal so as to determine the nature of the detected motion. That is, for example, the motion detector 134 may be configured to distinguish between signals corresponding to displacing and/or reorientating motion of the padlock 100, and environmental vibrations such as from wind or from passing traffic. The motion detector 134 may be configured only to emit an activation signal when it detects motion indicative of deliberate manipulation action on the padlock 100 by a user. This reduces the risk of a false alarm being raised.

The controller 130 is operable to be placed in a low-power dormant state when the opportunity arises. So, for example, the controller 130 places itself in the dormant state when there has been no physical interaction with the padlock 100 for a predetermined period. Further, for example, the controller can place itself in the dormant state after completion of an operation, such as latching the padlock shut, or releasing the padlock shackle 114.

Placing the controller 130 in the dormant state reduces recourse to power consumption from the battery 132. In an embodiment, all but a very small operational part of the controller 130 can be effectively switched off in the dormant state, with that remaining portion being receptive to the activation pulse and then being able to establish power supply to the other components of the controller 130. As will be appreciated any other identifiable electronic state change may be used instead of a pulse.

When the controller 130 is in the dormant state, at least functions with a tendency to consume high levels of electrical power are shut down. This will normally include all wireless communication functions. However, the injection of the activation pulse from the motion detector 134 causes the controller 130 to enter an active state, in which it executes a process to determine if a latch release signal should be issued to the latch displacement mechanism 124, or at least to determine whether a remote device authorizes or has authorized release of the shackle.

In the present embodiment, it is intended that, in the dormant state, no wireless communications systems are powered-up in the padlock 100, thus communication with the padlock 100 is disabled. However, embodiments may provide that the padlock 100 occasionally transitions from the dormant state to the active state briefly, to enable a supervision message to be sent (e.g. every few hours or once a day) to the padlock manager unit 300 to report that the padlock 100 remains operational. The supervision message could, for example, include an indication as to remaining stored battery power at the padlock 100.

Figure 6:
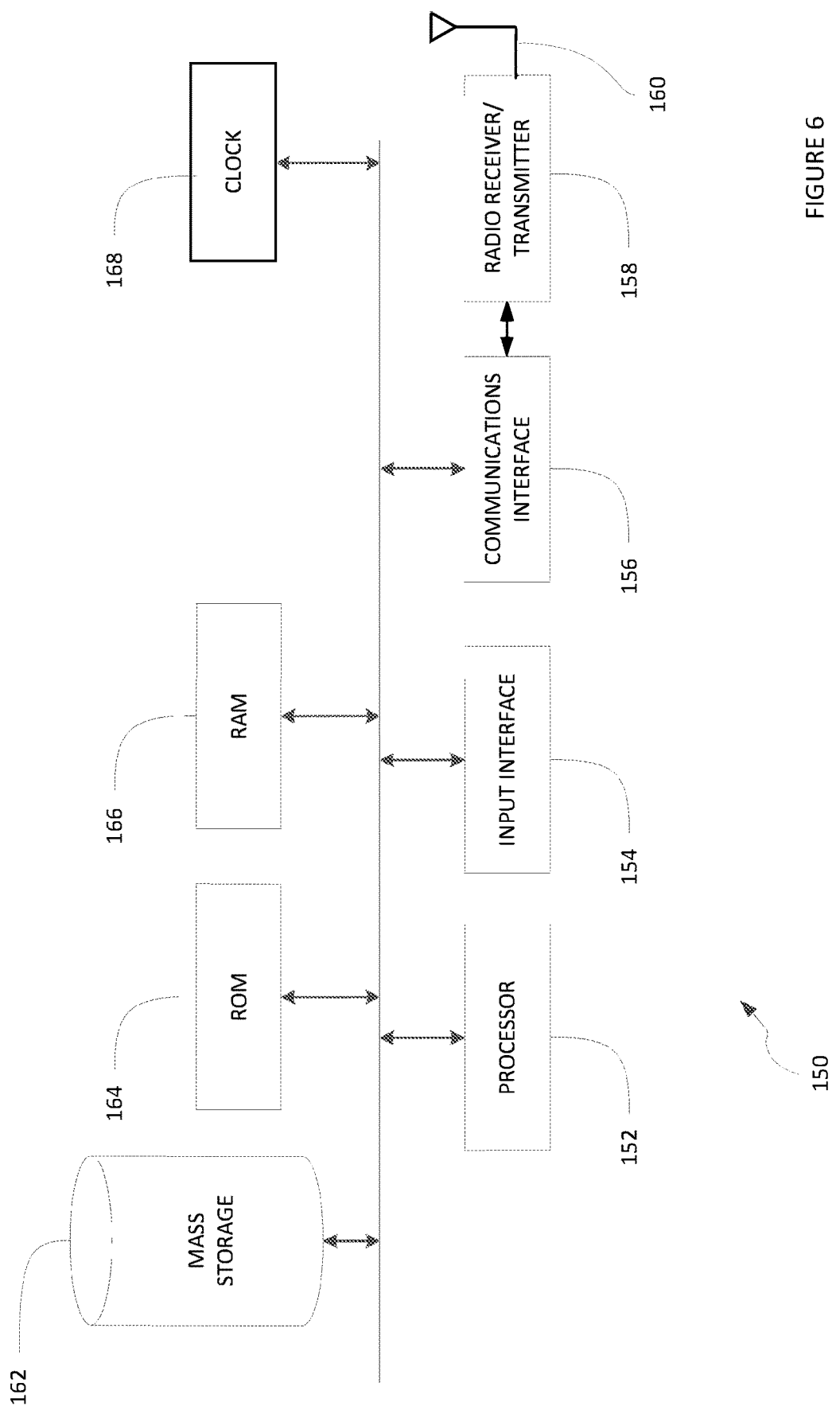
FIG. 6 is a schematic illustration of architecture of a controller of the processing electronics illustrated in FIG. 5.

Typically, the controller 130 is implemented by way of a computing device 150 as shown in FIG. 6. The controller comprises a processor 152 for processing computer executable instructions, and an input interface 154 for receiving signals and messages. A communications interface 156 enables the controller 130 to establish wireless connectivity with other devices. A radio transmitter/receiver 158 and an antenna 160 establish radio communication in conjunction with the communications interface 156.

A mass storage unit 162, such as a solid state storage device, stores one or more computer programs, and associated data, for execution by the processor 152. A Read Only Memory (ROM) 164 provides a non-erasable memory facility for the processor 152. A Random Access Memory 166 provides a rapidly accessible storage facility for use in execution of computer programs by the processor 162.

Finally, a clock 168 governs the operation of the device 160.

The controller 130 can be implemented as a single integrated circuit, or a plurality of interconnected devices. It may be implemented, in whole or in part, by means of an application specific integrated circuit (ASIC), a field programmable gate array (FPGA), or a general purpose computing device. In an embodiment, a design distinction may be made between parts of the controller 130 which are powered down when the controller is in the dormant state and parts which remain powered and operational. In one embodiment, for example, parts of the controller 130 dedicated to wireless communication may be independently powered, so that they can be deactivated when the controller 130 is in the dormant state.

The computing device 150 implements the controller 130 by way of software stored on the mass storage unit 162 and the ROM 164. Execution of the software by the computing device 150 causes the controller 130 to operate.

Figure 7:
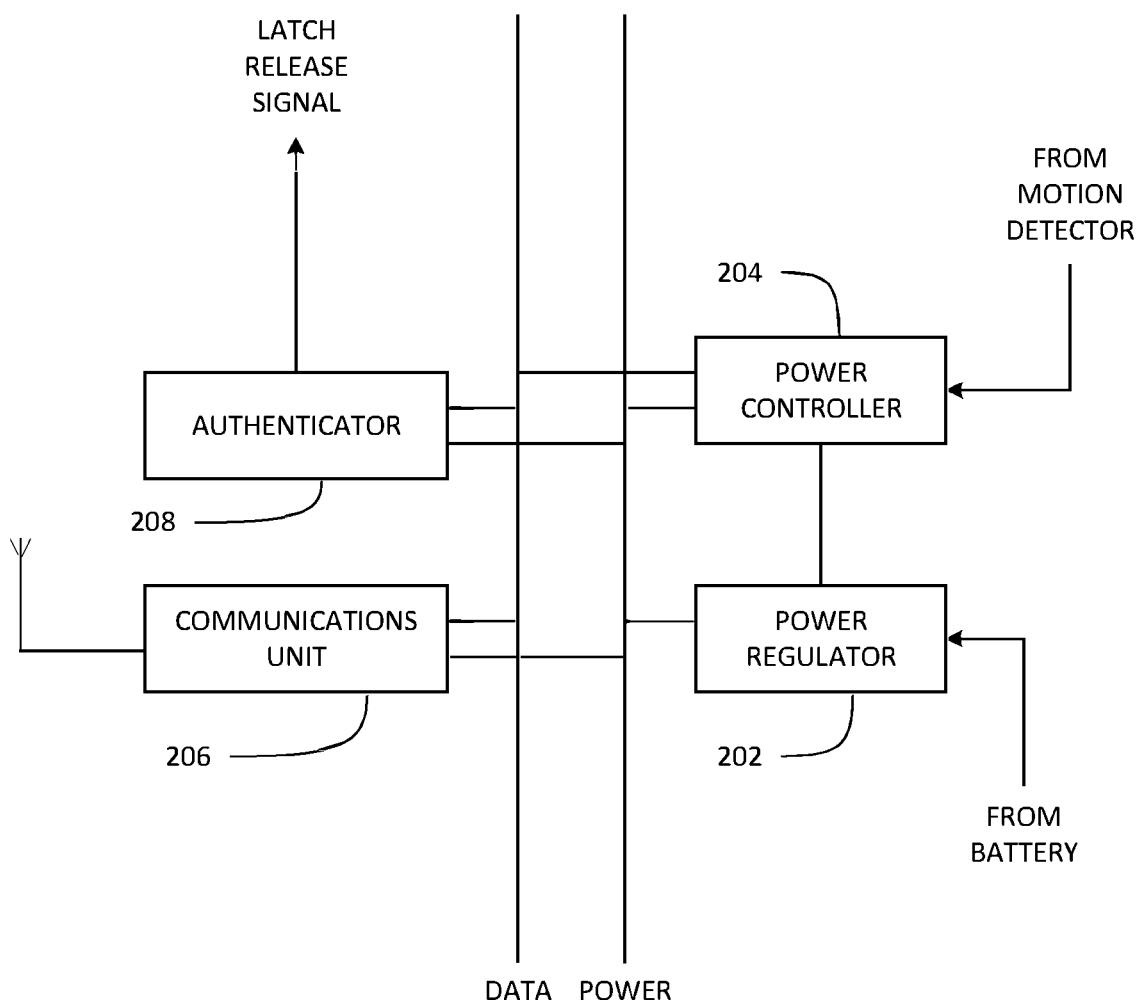
FIG. 7 is a functional illustration of the processing electronics illustrated in FIG. 5.

FIG. 7 shows a functional description of the controller 130, as implemented by software. As shown in FIG. 7, the controller 130 comprises a power regulator 202 which receives a power supply from the battery and provides a regulated power supply to all other elements of the controller 130. A power controller 204 is operable to control the power regulator. The power controller 204 receives a residual power supply from the power regulator 202 in all circumstances, and, in the dormant state, is operable to activate the supply, by the power regulator 202, of the regulated power supply, thereby causing the controller 130 to enter the active mode, on receiving an activation pulse from the motion detector 134.

A communications unit 206 is illustrated. This unit provides a facility for the controller 130 to seek a padlock release message from the padlock manager unit 300. This padlock release message indicates that the lock may be released. On receiving a padlock release message, the message is authenticated by an authenticator 208. If the authorisation message is successfully authenticated, it causes the issuance of a latch release signal to the latch displacement mechanism 24.

Figure 8:
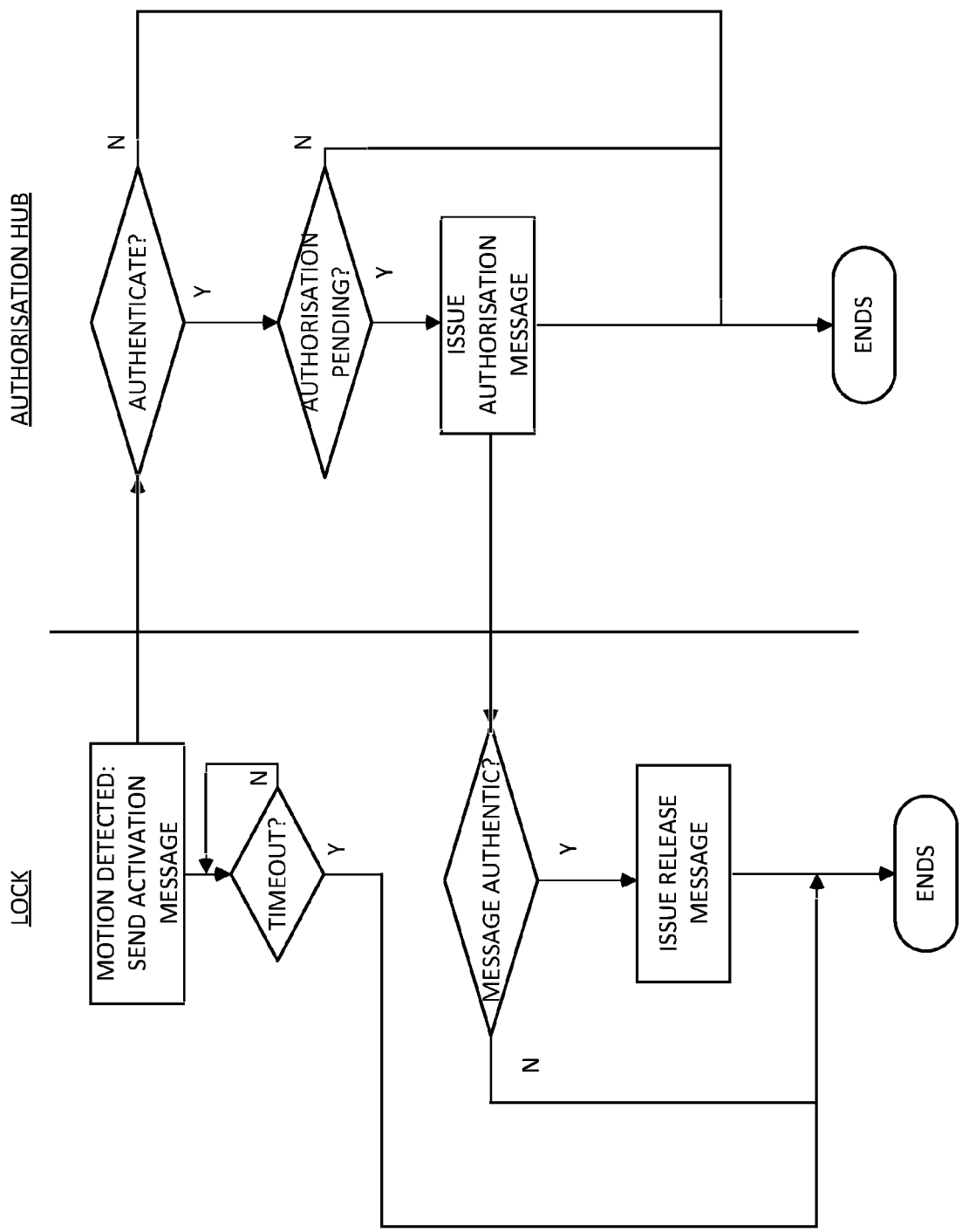
FIG. 8 is a swimlane diagram illustrating process steps carried out at the padlock and at a padlock manager unit of the embodiment.

This scenario is illustrated in further detail in FIG. 8. As shown, the padlock 100 is deployed, and a permitted user has been sent to unlock it. The process for activating release of the padlock is shown in FIG. 8. FIG. 8 is a swimlane diagram, for processing steps carried out at the lock 100, and the padlock manager unit 300.

In the first instance, as previously described in general terms, the padlock manager unit 300 is used to issue an authorisation to release the padlock. This process could be conducted online, i.e. using a computing device associated with a party requesting authorisation, or could be conducted offline by, for example, a telephone conversation between the operator of the padlock manager unit 300 and the party to be authorised.

This sets a timer at the padlock manager unit 300 for pendency of the authorisation.

On arrival at the padlock 100, the user handles it, causing the padlock 100 to move. This activates the motion detector 134, which in turn produces the activation pulse, thus causing the power controller 204 to initiate the active mode. In the active mode, the padlock 100 issues an activation message to the padlock manager unit 300.

This activation message may comprise identifying information, in case the padlock manager unit 300 manages several similarly configured padlocks.

The padlock information manager 300, on receipt of the activation message, authenticates the activation message. This could be done by processing a pre-determined authentication token issued to the padlock 100 on initial registration with the padlock information manager 300. This ensures that the padlock 100 is associated with the padlock information manager 300. If the authentication fails, then the process ends.

In other embodiments, the token could be generated in advance of deployment of the padlock 100, such as in response to receiving a prior request for a token, or it could be generated in response to the message sent by the padlock 100, or it could be generated by the user of the padlock management unit 300 of their own volition. For example, a person at the lock may telephone the user of the padlock management unit 300 asking the user (remote from the lock) to provide the token.

If the authentication succeeds, then the padlock information manager 300 determines if an authorisation is pending. If it is not, then the process ends.

If an unexpired authorisation is determined, then the padlock management unit 300 issues a padlock release message to the padlock 100. This padlock release message may, again, contain authentication information to avoid unauthorised release messages causing unauthorised release of the padlock 100.

If the padlock 100, within a predetermined period of time, does not receive a padlock release message, then the padlock 100 enters an alarm state. In the alarm state, if the motion detector 134 detects further motion commensurate with handling of the padlock by a human, then an alarm signal is issued.

As discussed above, this alarm signal can comprise a locally audible alarm sound, or can comprise an alarm message sent to the padlock manager unit 300. The alarm message can comprise an indication of the identity of the padlock 100.

If the latter arrangement is implemented, then the padlock manager unit 300 is responsive to receipt of an alarm message and determines a response. The response may be a user message, such as a visual or audible alert message to a user.

If the padlock 100 does receive a padlock release message in a timely fashion, the padlock release message is processed to determine if it is authentic. This could be by way of a cryptographic calculation. If the message is authentic, then a latch signal is issued by the controller 130, to the latch displacement mechanism 124.

As will be appreciated, the various alarm conditions and exceptions are not illustrated in FIG. 8 for reasons of clarity.

Figure 9:
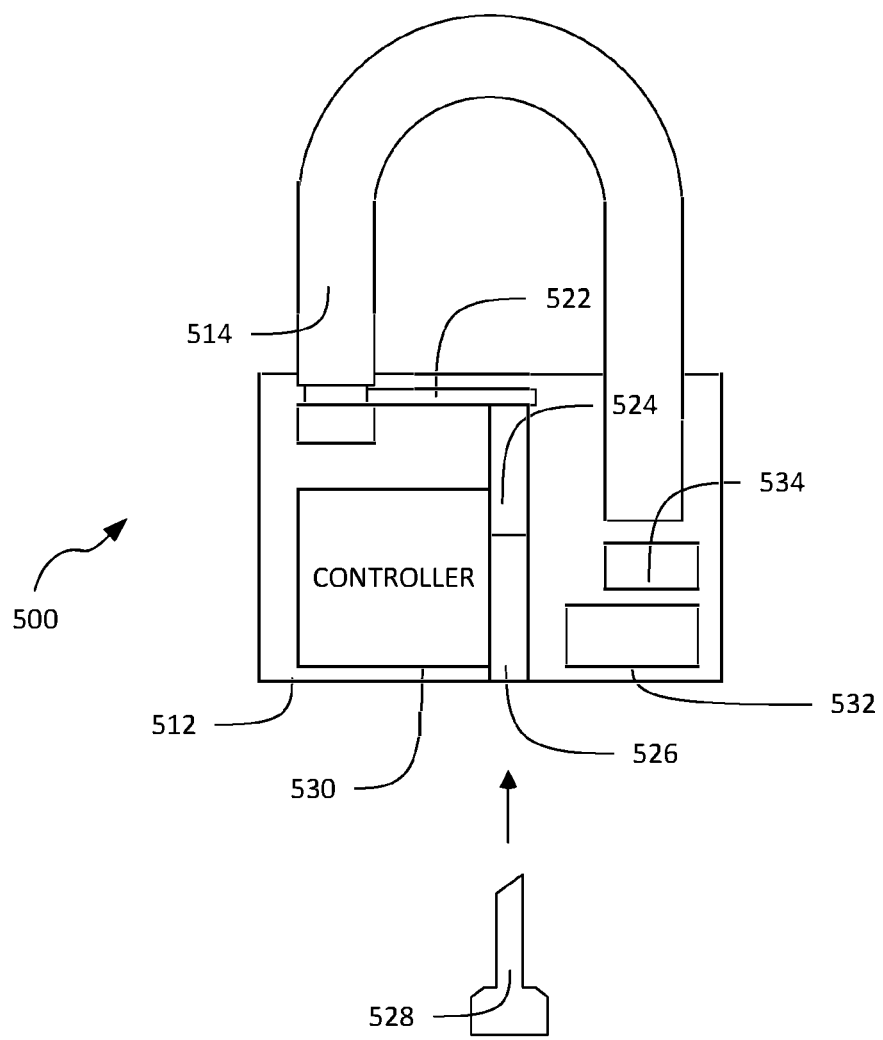
FIG. 9 is a schematic interior view of a padlock in accordance with another embodiment.
Figure 10:
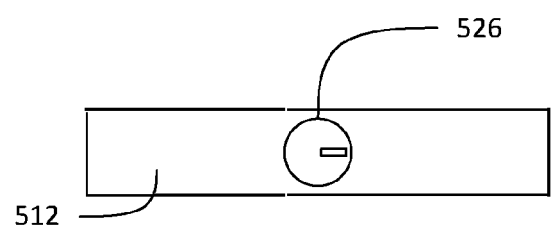
FIG. 10 is a schematic base view of the padlock of FIG. 9.

FIG. 9 illustrates a further embodiment of a padlock 500 in accordance with the disclosure. As before, a shackle 514 is engaged in a body 512 of the padlock 500. A latch 522 controls release of the shackle 514, and displacement of the latch 522 is effected through a latch displacement mechanism 524. As before, a controller 530, a motion detector 534 and a battery 532 are provided.

However, in this case, as shown further in FIG. 11, a key barrel 526 presents a bore on the underside of the body 512, for receiving a key 528. When a matching key 528 is inserted into the key barrel 526, it engages with a mechanism of the barrel which can be rotated with respect to the body 512. Rotational movement of the barrel with respect to the body 512 engages with the latch displacement mechanism 524 to cause release of the latch 522 from the shackle 514.

In this embodiment, as before, the controller 530 can reside in a dormant state or an active state. In the dormant state, wireless communication capability of the controller 530 is powered down, to manage power consumption. The padlock 500 can be put in the active state by detection of motion affecting the padlock 500.

On entry into the active state, the padlock 500 issues an activation message, which will be received by the padlock manager unit 300 as before. Similar to the previously described procedure, the padlock manager unit 300 may issue an authorisation message to the padlock 500 in the event that an unlock attempt is expected (i.e. that a party has been authorised to unlock the padlock 500).

However, if an unlock attempt is not expected, that is, because a party has not been authorised or that any authorisation has expired, then the padlock manager unit 300 may issue an alarm message to the padlock 500.

The padlock 500 is responsive to receipt of an alarm message, or to lack of receipt of an authorisation message within a predetermined period of time, by entering an alarm state. In the alarm state, a number of different responses are contemplated within the scope of this disclosure. For example, an alarm sounder may be incorporated into the padlock 500, for emission of an alarm sound. Further, an alarm may be sounded or displayed at the padlock manager unit 300. Yet further, an alarm sounder, or visual beacon, may be installed separately but locally to the padlock, and the padlock manager unit 300, or the padlock 500, may issue an alarm sounding signal to such a device.

Further embodiments can be envisaged. For example, instead of a physical mechanical key, an electronic token may be provided. Further, other mechanisms for user interaction with the padlock can be envisaged. In one example, a plurality of thumbwheels can be provided, for configuration of a numeric sequence for unlocking the padlock. This can be supported by software to engage the thumbwheels with the release mechanism, and optionally a one-shot passcode for use on thumbwheels can be issued to a user. A similar mechanism can be implemented using a keypad on the lock.

Instead of a mechanical latch release mechanism, an electronic release may be provided, in which the padlock can be capable of receiving a digital key from a proximate device such as held by the party authorised to open the lock. The digital key can be communicated to the padlock by a keypad or by wireless communication, such as NFC or Bluetooth communication.

Voice recognition software could be implemented to enable voice interaction between the padlock and the party authorised to unlock the padlock.

A biodata key may be implemented, such that a suitably configured reader can be provided on the padlock so as to read a biometric characteristic of the user, and to authenticate the user against that biometric characteristic. Suitable examples of biometric characteristics include fingerprints or iris profiles.

It will be understood that all illustrated embodiments are provided in schematic form. Some or all of the components may be integrated, or provided separately. For instance, the power manager may be integrated with the controller in a single processor. For example the power manager can be a power management feature of an integrated circuit which provides all or some of the other electronic components of the padlock.

What constitutes a sleep state may depend on implementation and, in particular, power consumption of specific components. It may not be necessary for all components, particularly low power consumption components, to be powered down in sleep state.

Optionally the transceiver may be separate to other components which may be integrated into one device. It may be sufficient only to power down the transceiver to avoid high power consumption associated with wireless communication. In other embodiments, the power manager may be distinct from the controller.

The permitted user as referred to herein need not be the same person as the one who provides the user input action at the padlock manager unit. This may allow for example, and owner/authorizer, who may be remote from the padlock, to authorize opening of the padlock so that the padlock can be removed by a different person. Further, rather than granting permission to a permitted user, per se, the padlock manager unit 300 may optionally be agnostic to the identity of the person handling the padlock.

Further features, examples and variations will be apparent to the reader of the above illustrative embodiments. While features have been described in respect of specific embodiments, the disclosure is intended to encompass all conceivable combinations of the disclosed features. Nothing in the preceding description should be read as a limitation on the scope of the claims appended hereto.

In addition, any priority document(s) of this application is/are hereby incorporated herein by reference in its/their entirety.

What is claimed is:

1. A system comprising a padlock and a padlock manager; the padlock comprising a body, a shackle and a latch, the latch being operable to retain the shackle in a closed state with respect to the body, wherein the padlock comprises processing electronics capable of being in a dormant state or an active state, comprising:
   a motion detector for detecting motion of the padlock;
   a controller operable to place the processing electronics in the active state on detection of motion of the padlock; and
   a transmitter and receiver that are embodied by a wireless communications interface that comprises a cellular wireless communications interface;
   the transmitter being operable, in the active state, to use the cellular wireless communications interface to transmit a cellular wireless communication comprising an activation message on entry of the processing electronics into the active state; and
   the receiver being operable, in the active state, to use the cellular wireless communications interface to receive a cellular wireless communication comprising an authorisation message;
   wherein, in the dormant state, the transmitter and receiver are inoperable; and
   the padlock manager is operable to receive the activation message from the padlock and to issue the authorisation message to the padlock.

2. The system in accordance with claim 1, wherein the padlock comprises a release mechanism, the release mechanism being operable to cause the latch to release the shackle from the closed state, wherein the controller is operable, on receipt by the receiver of the authorisation message to issue a release signal to cause the release mechanism to cause the latch to release the shackle from the closed state.

3. The system in accordance with claim 1, wherein the processing electronics is operable, on transmission of the activation message, to wait for receipt of the authorisation message and, if the authorisation message is not received in a predetermined time, to place the processing electronics in an alarm state.

4. The system in accordance with claim 1, wherein the padlock manager comprises an authoriser operable to create a time-limited authorisation window and to only issue an authorisation message if the activation signal is received within the time-limited authorisation window.

5. The system according to claim 1, wherein a user of the padlock manager has an ability, prior to receiving the activation message, to grant permission for the padlock manager to generate a padlock release message in response to the activation message.

6. The system according to claim 1, wherein the padlock manager is operable to issue the authorisation message to the padlock in the event that a party has been authorised to unlock the padlock.

7. The system according to claim 1, wherein to avoid false alarms, the padlock is configured to at least one of:
   make a distinction between a short movement of the padlock, which may be an inadvertent jostling of the padlock, and a prolonged series of movements indicative of a persistent attempt to open the padlock;
   make a distinction between signals corresponding to displacing and/or reorientating motion of the padlock, and environmental vibrations; or
   only to emit an activation signal when it detects motion indicative of deliberate manipulation action on the padlock.

8. The system according to claim 1, wherein the padlock manager is configured such that a user has an ability to generate, of their own volition, a token for enabling release of the shackle.

9. The system according to claim 1, wherein if the activation message is received by a padlock manager and there is no pending granted permission, the system is configured to raise an alarm that the padlock is being manipulated by a person without permission to do so.

10. The system according to claim 1, wherein the padlock is configured to occasionally transition from the dormant state to the active state briefly, to enable a supervision message to be sent to the padlock manager to report that the padlock remains operational.

11. The system in accordance with claim 1, wherein in response to an attempted unauthorized opening of the padlock, the padlock manager is configured to at least one of:
   generate an output to alert a user of the padlock manager; or
   trigger activation of a video camera overlooking the site of deployment of the padlock, so that a user of the padlock manager can observe a situation and potentially determine an identity of an unauthorised individual at the padlock.

12. The system in accordance with claim 1, wherein the padlock manager comprises distributed computer processing facilities provided by a server/client structure between a processing service provider and an application configured to run on a mobile telephone or other personal computing device.

13. The system in accordance with claim 1, wherein if the activation message corresponds with a granted permission, the padlock manager is configured to send to the padlock a padlock release message.

14. The system according to claim 1, wherein in response to the padlock receiving the authorisation message, the padlock is configured to open automatically or becoming openable.

15. The system according to claim 14, wherein the padlock is configured such that release of the padlock does not require an object to be carried by a user.

* * * * *